(12) United States Patent
Jung et al.

(10) Patent No.: US 9,233,854 B2
(45) Date of Patent: Jan. 12, 2016

(54) METHOD OF FABRICATING A METAL OXIDE

(71) Applicant: Electronics and Telecommunications Research Institute, Daejeon (KR)

(72) Inventors: Mi Hee Jung, Daejeon (KR); Moo Jung Chu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/447,761

(22) Filed: Jul. 31, 2014

(65) Prior Publication Data

US 2015/0191363 A1 Jul. 9, 2015

(30) Foreign Application Priority Data

Jan. 9, 2014 (KR) ........................ 10-2014-0002915

(51) Int. Cl.
*H01L 21/36* (2006.01)
*C01G 9/02* (2006.01)
*H01G 9/20* (2006.01)

(52) U.S. Cl.
CPC ................. *C01G 9/02* (2013.01); *H01G 9/204* (2013.01); *C01P 2004/16* (2013.01); *C01P 2006/40* (2013.01); *H01G 9/2059* (2013.01)

(58) Field of Classification Search
USPC ......................................................... 438/478
See application file for complete search history.

(56) References Cited

U.S. PATENT DOCUMENTS

| 8,383,018 | B2 | 2/2013 | Park | |
| 2005/0214190 | A1* | 9/2005 | Hyeon et al. | 423/299 |
| 2010/0051903 | A1 | 3/2010 | Cho | |
| 2011/0052896 | A1* | 3/2011 | Jayaraman | 428/221 |
| 2014/0050925 | A1* | 2/2014 | Sueda | C01G 9/02 428/402 |

FOREIGN PATENT DOCUMENTS

KR 10-2010-0026930 A 3/2010

OTHER PUBLICATIONS

Tammy P. Chou et al., "Hierarchically Structured ZnO Film for Dye-Sensitized Solar Cells with Enhanced Energy Conversion Efficiency", Advanced Materials, vol. 19, pp. 2588-2592, Sep. 2007.

(Continued)

*Primary Examiner* — Asok K Sarkar
(74) *Attorney, Agent, or Firm* — Rabin & Berdo, P.C.

(57) ABSTRACT

A method of fabricating a metal oxide sheet having a polycrystalline structure includes mixing a metal precursor material, a base material, and distilled water with each other to fabricate a preparation solution; adding an anionic surfactant into the preparation solution to forming a precursor solution; forming metal oxide nanoparticles in the precursor solution, wherein each of the metal oxide nanoparticles comprises a metal cation and an oxygen anion; and fabricating a metal oxide sheet by coupling the metal oxide nanoparticles to each other, wherein, in an aspect of a plane, the metal oxide sheet has a hexagonal shape and a polycrystalline structure.

7 Claims, 8 Drawing Sheets

(56) References Cited

OTHER PUBLICATIONS

Qifeng Zhang et al., "Aggregation of ZnO Nanocrystallites for High Conversion Efficiency in Dye-Sensitized Solar Cells", Angewandte Chemie International Edition, vol. 47, pp. 2402-2406, Feb. 2008.

P W Tasker, "The stability of ionic crystal surfaces" J. Phys. C: Solid State Phys, vol. 12, pp. 4977-4983, Nov. 1979.

* cited by examiner

METHOD OF FABRICATING A METAL OXIDE

CROSS-REFERENCE TO RELATED APPLICATIONS

This U.S. non-provisional patent application claims priority under 35 U.S.C. §119 of Korean Patent Application No. 10-2014-0002915, filed on Jan. 9, 2014, the entire contents of which are hereby incorporated by reference.

BACKGROUND OF THE INVENTION

The present invention disclosed herein relates to metal oxide, and more particularly, to a method of fabricating polycrystalline metal oxide used in a solar cell.

Because of the exhaustion of fossil energy, studies on alternative energy are being actively performed. In particular, studies on alternative energy using inexhaustible natural phenomena, such as sun's rays and wind are being in the spotlight.

Solar cells generate electric energy by using light energy released from the sun. Solar cells may be classified into solar cells made of inorganic materials such as silicon or compound semiconductors and dye-sensitized solar cells in which dye is adsorbed onto particles surfaces of nanocrystalline oxide according to its material composition. Such a solar cell is coming into the spotlight in that the source of solar energy is not depleted, and the solar energy is eco-friendly energy.

SUMMARY OF THE INVENTION

The present invention provides a method of fabricating a polycrystalline metal oxide having various shapes.

The object of the present invention is not limited to the aforesaid, but other objects not described herein will be clearly understood by those skilled in the art from descriptions below.

Embodiments of the present invention provide methods of fabricating metal oxide having a polycrystalline structure, the methods including: mixing a metal precursor material, a base material, and distilled water with each other to fabricate a preparation solution; adding an anionic surfactant into the preparation solution to forming a precursor solution; forming metal oxide nanoparticles in the precursor solution, wherein each of the metal oxide nanoparticles includes a metal cation and an oxygen anion; and fabricating a metal oxide sheet by coupling the metal oxide nanoparticles to each other, wherein, in an aspect of plane, the metal oxide sheet has a hexagonal shape and polycrystalline structure.

In some embodiments, each of the metal oxide nanoparticles may have first end and the other end, which face each other, and the anionic surfactant may cover the first end and the second end of the metal oxide nanoparticle, and a side portion of the metal oxide nanoparticle may be spaced apart from the anionic surfactant.

In other embodiments, a coupling reaction rate at the side portion of the metal oxide nanoparticle may be faster than that at each of the first end and the second end of the metal oxide nanoparticle.

In still other embodiments, the fabricating of the metal oxide sheet may include horizontally coupling the metal oxide nanoparticles to each other, wherein the surfactant may be provided to upper and lower ends of the metal oxide nanoparticle.

In even other embodiments, the anionic surfactant may be dissociated into a cation and an active agent in the precursor solution, and the active agent may include a hydrophobic functional group and a hydrophilic functional group coupled to the hydrophobic functional group, and the metal oxide nanoparticle may be disposed between the hydrophilic functional group and the cation of the anionic surfactant.

In yet other embodiments, the hydrophilic functional group of the anionic surfactant may be provided on the metal cation of the metal oxide nanoparticle, and a cation of the anionic surfactant may be provided on the oxygen anion of the metal oxide nanoparticle.

In further embodiments, the forming of the metal oxide nanoparticles and the fabricating of the metal oxide sheet may be performed by thermally treating the precursor solution.

In other embodiments of the present invention, methods of fabricating metal oxide include: mixing a metal precursor material, a base material, and distilled water to fabricate a preparation solution; adding a cationic surfactant into the preparation solution to forming a precursor solution; thermally treating the precursor solution to form metal oxide nanoparticles, wherein each of the metal oxide nanoparticles includes a metal cation and an oxygen anion; and coupling the metal oxide nanoparticles to each other to fabricate a metal oxide nanowire.

In some embodiments, the cationic surfactant may be coupled to at least one metal cation of the metal oxide nanoparticles, and the oxygen anion of the one metal oxide nanoparticle may be spaced apart from the cationic surfactant.

In other embodiments, the oxygen anion of the one metal oxide nanoparticle may be coupled to the second of the metal oxide nanoparticles.

In still other embodiments, the cationic surfactant may be dissociated into a quaternary ammonium cation and an anion in the precursor solution.

In even other embodiments, the precursor solution may include zinc nitrate hexadrate ($Zn(NO_3)_2 \cdot 6H_2O$), and a base solution may include hexamethylenete tramine ($C_6H_{12}N_4$).

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

The present invention may be best appreciated by referring to the following like reference numerals used for referring to the same or similar elements in the description and drawings.

DETAILED DESCRIPTION OF PREFERRED EMBODIMENTS

It is noted that the appending drawings illustrating preferred embodiments and descriptions thereof should be referred adequately to appreciate the advantages in every aspect of the operation of inventive devices and the purposes accomplished by the implementation of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Appropriate environment for performing the concepts according to the present invention will be clearly understood by those skilled in the art from descriptions below.

In the following description, the technical terms are used only for explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

It will be understood that when an element such as a layer, film, region, or substrate is referred to as being "on" another element, it can be directly on the other element or intervening elements may also be present.

Also, though terms like a first, a second, and a third are used to describe various regions and layers in various embodiments of the present invention, the regions and the layers are not limited to these terms. These terms are used only to discriminate one region or layer from another region or layer. Therefore, a layer referred to as a first layer in one embodiment can be referred to as a second layer in another embodiment. An embodiment described and exemplified herein includes a complementary embodiment thereof. In the drawings, like reference numerals refer to like elements throughout.

Unless otherwise defined, all terms (including technical and scientific terms) used herein have the same meaning as generally understood by those skilled in the art.

Hereinafter, exemplary embodiments of the present invention will be described below in more detail with reference to the accompanying drawings.

Hereinafter, a method of fabricating metal oxide according to the present invention with reference to the accompanying drawings.

FIGS. 1 to 5 are schematic views illustrating a process of fabricating metal oxide according to an embodiment of the present invention.

Figure 1:
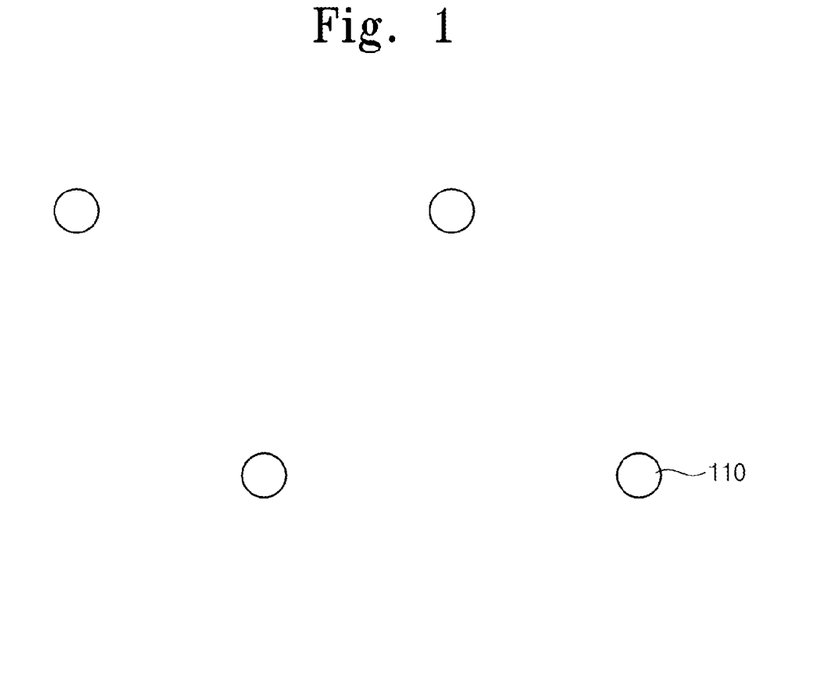
FIGS. 1 to 5 are schematic views illustrating a process of fabricating metal oxide according to an embodiment of the present invention.

Referring to FIG. 1, a metal precursor material and a base material may dissolve in distilled water to fabricate a preparation solution. For example, zinc nitrate hexadrate, $Zn(NO_3)_2 \cdot 6H_2O$ may be used as the precursor material, and hexamethylenetetramine (HMTA) ($C_6H_{12}N_4$) may be used as the base material. As an example, the zinc nitrate hexadrate and the hexamethylenetetramine may have density of about 25 mM, respectively. The base material may dissolve in the distilled water to provide hydroxyl ion (OFF). The preparation solution may include a metal cation 110, for example, $Zn^{2+}$.

Figure 2:
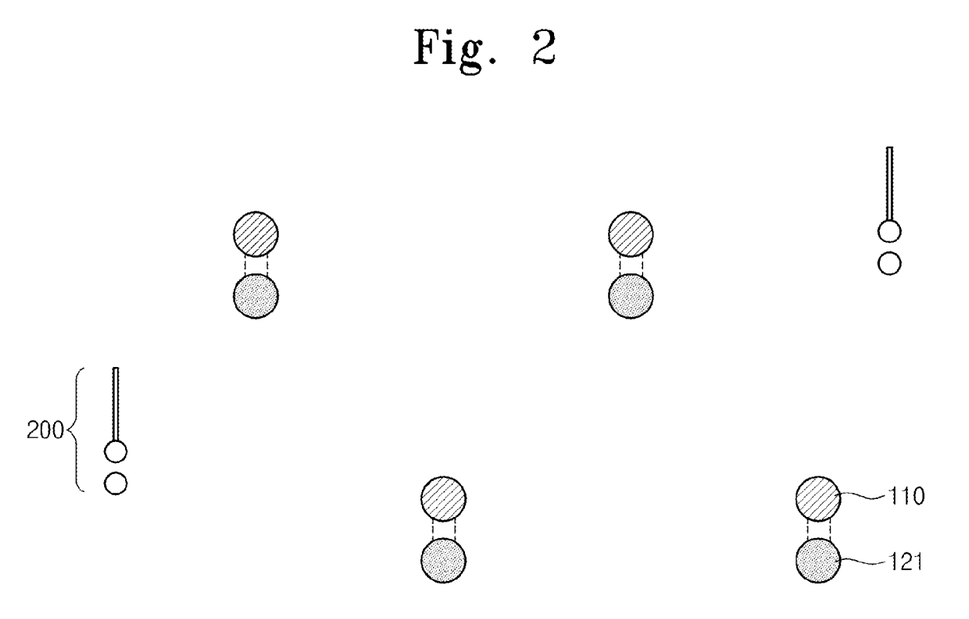

Referring to FIG. 2, an anionic surfactant 200 may be added into the preparation solution to fabricate a precursor solution. For example, sodium dodecyl sulfate (SDS) may be used as the anionic surfactant. The precursor solution may include a metal hydroxide. The metal hydroxide may include the metal cation 110 and a hydroxyl group 121 having an anionic property. As an example, the metal hydroxide may include at least one zinc hydroxide selected from $ZnOH^+$, $Zn(OH)_2$, $Zn(OH)_3^-$, and $Zn(OH)_4^{2-}$. For example, the precursor solution may include $Zn(OH)_2$.

Figure 3:
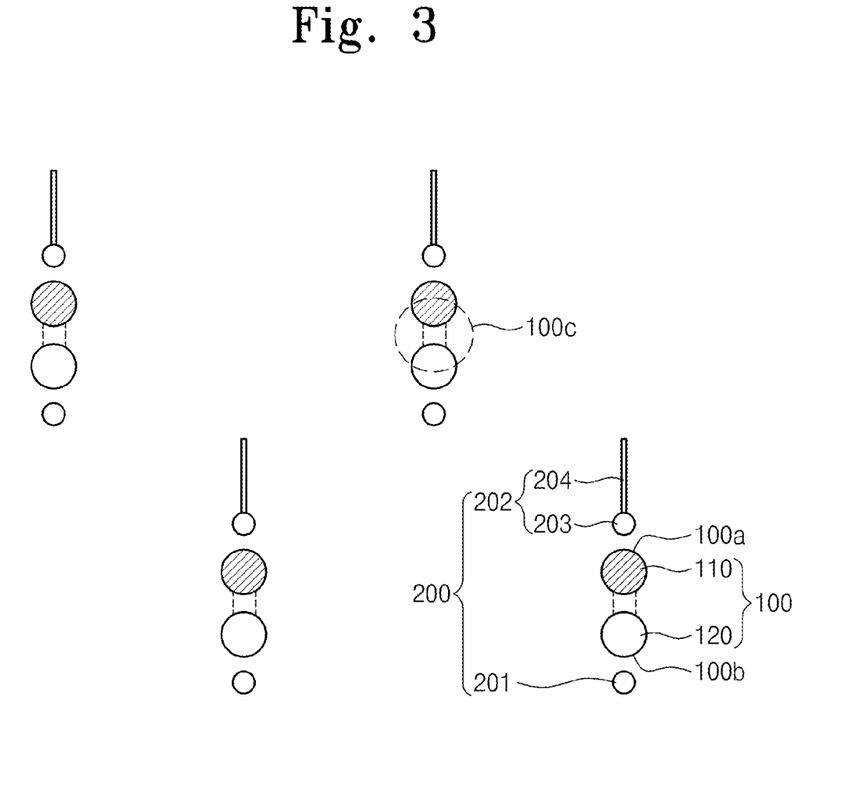

Referring to FIG. 3, metal oxide nanoparticles 100 may be formed in a metal precursor solution. The metal oxide nanoparticles 100 may be formed through a condensation reaction of the metal hydroxide. For example, metal precursor solution is heat treated at a temperature between about 70° C. and 90° C., particularly at 90° C. to form the metal oxide nanoparticles 100. The metal oxide nanoparticles 100 may be heat treated for about 4 hours to 48 hours, particularly for about 24 hours.

The metal oxide nanoparticles 100 may include the metal cation 110 and an oxygen anion 120 combined with the metal cation 110. The metal cation 110 may be disposed on one end 100a of each of the metal oxide nanoparticles 100. The oxygen anion 10 may be disposed on the other end 100b of each of the metal oxide nanoparticles 100. The one end 100a and the other end 100b of the metal oxide nanoparticle 100 may face each other. An anionic surfactant 200 may be dissociated in the precursor solution to provide a cation 201 and an activating group 202. The activating group 202 may include a hydrophilic functional group 203 and a hydrophobic functional group 204 combined with the hydrophilic functional group 203. The hydrophilic functional group 203 may have a negative charge property. Each of the metal oxide nanoparticles 100 may be disposed between the hydrophilic functional group 203 and the cation 201 of the anionic surfactant 200. The hydrophilic functional group 203 of the anionic surfactant 200 may interact with the metal cation 110 of the metal oxide nanoparticle 100. Accordingly, the hydrophilic functional group 203 of the anionic surfactant 200 may be provided on the one end 100a of the metal oxide nanoparticle 100. The cation 201 of the anionic surfactant 200 may interact with the oxygen anion 120 of each of metal oxide nanoparticles 100. The cation 201 of the anionic surfactant 200 may be provided on the other end 100b of the metal oxide nanoparticle 100. The one end 100a and the other end 100b of the metal oxide nanoparticle 100 may be covered by the anionic surfactant 200. A side portion 100c of the metal oxide nanoparticle 100 may not be covered by the anionic surfactant 200. Here, the side portion 100c of the metal oxide nanoparticle 100 may be defined as between the one end 100a and the other end 100b of the metal oxide nanoparticle 100.

Figure 4:
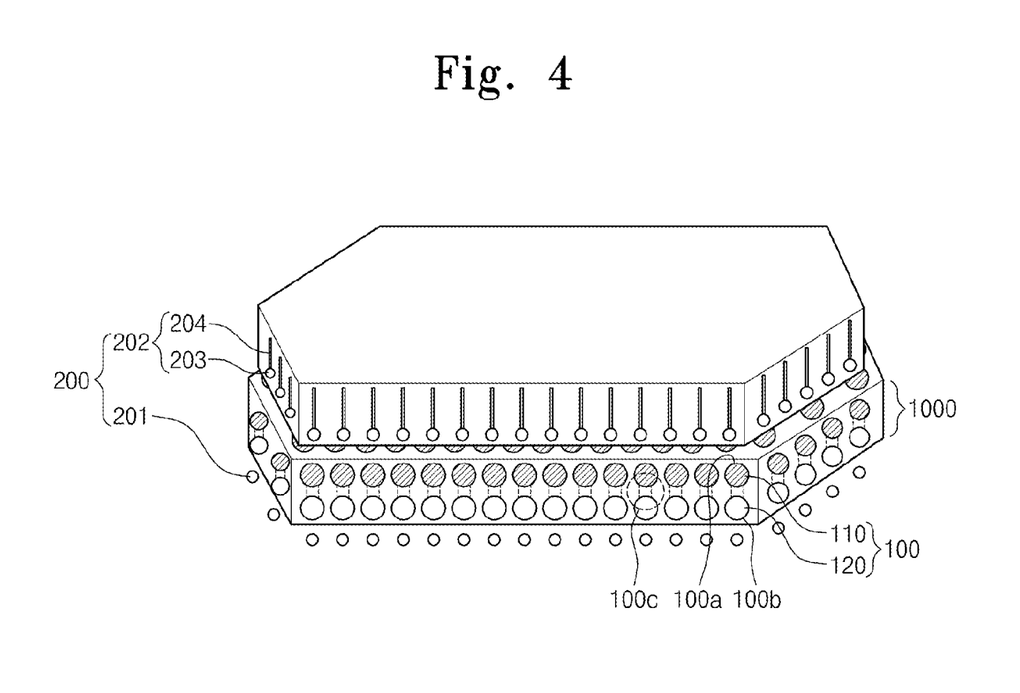

Referring to FIG. 4, the metal oxide particles 100 are combined each other to fabricate a metal oxide sheet 1000. The metal oxide sheet 1000 may have a polycrystal structure. In an aspect of plan, the metal oxide sheet 100 may have a hexagonal shape. The metal oxide nanoparticles 100 may be formed and coupled to each other through the same process. For example, the metal oxide nanoparticles 100 may be formed and combined with each other through the heat treatment process described above as an example of FIG. 3. Here, the metal oxide nanoparticles 100 may similarly function as a seed.

The metal nanoparticles 100 may be difficult to be combined with each other in directions of one end 100a and the other end 100b due to the anionic surfactant 200. The side portion 100c of the metal oxide nanoparticle 100 may be spaced apart from the anionic surfactant 200. The metal oxide nanoparticles 100 may be combined with each other through the side portions 100c thereof. A coupling reaction rate at the side portion 100c of the metal oxide nanoparticle 100 may be faster than that at each of the one end 100a and other end 100b of the metal oxide nanoparticle 100. The metal oxide nanoparticles 100 may be horizontally coupled to each other due to the anionic surfactant 200.

Figure 5:
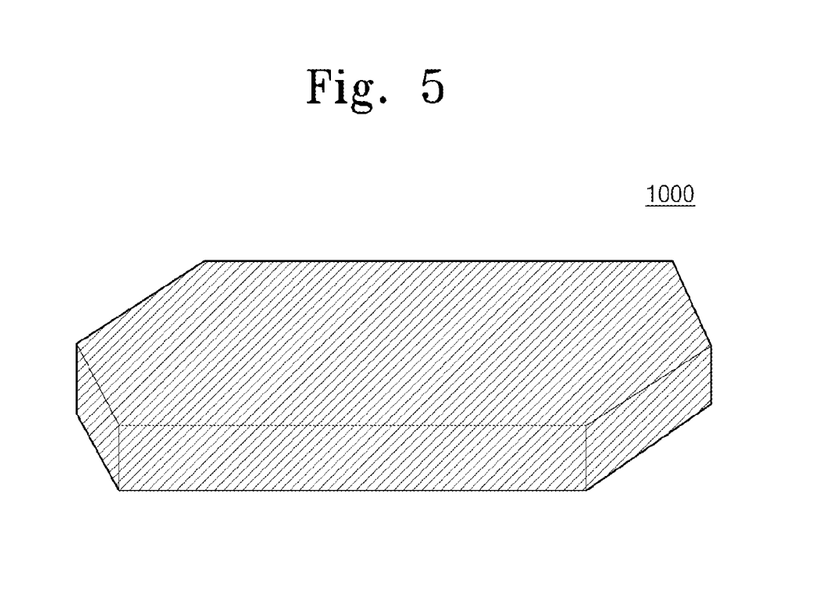

Referring to FIG. 5, the metal oxide sheet 1000 may be sintered. The sintering of the metal oxide 1000 may be processed at 350° C. for an hour. The anionic surfactant 200 in FIG. 5 and impurities may be removed through the sintering of the metal oxide sheet 1000. And thus, the metal oxide sheet 1000 may be fabricated.

Figure 6:
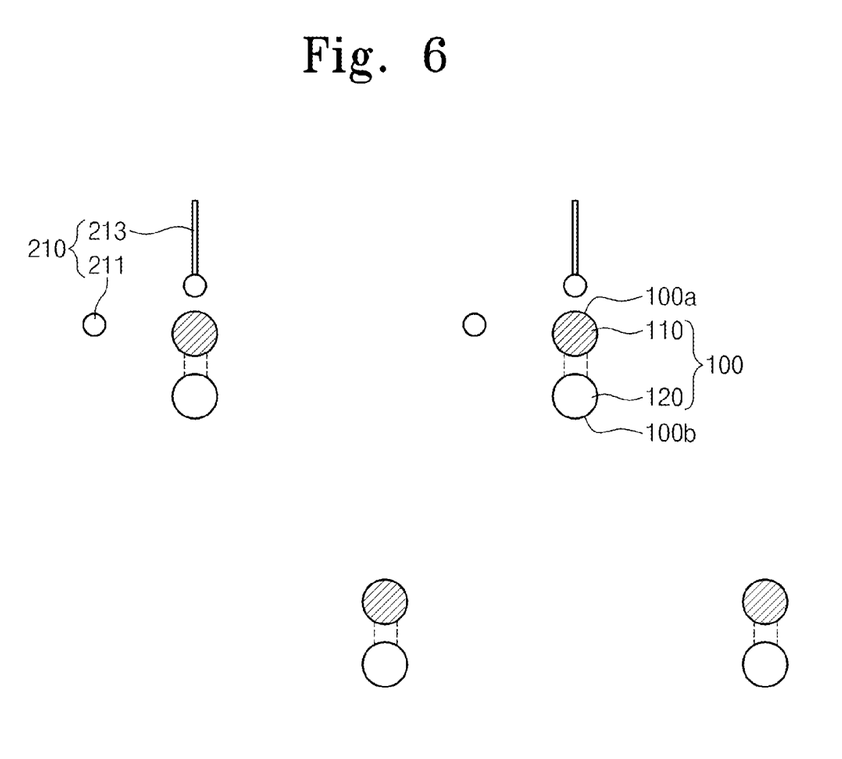
FIGS. 6 to 8 are schematic views illustrating a process of fabricating metal oxide according to an embodiment of the present invention.
Figure 7:
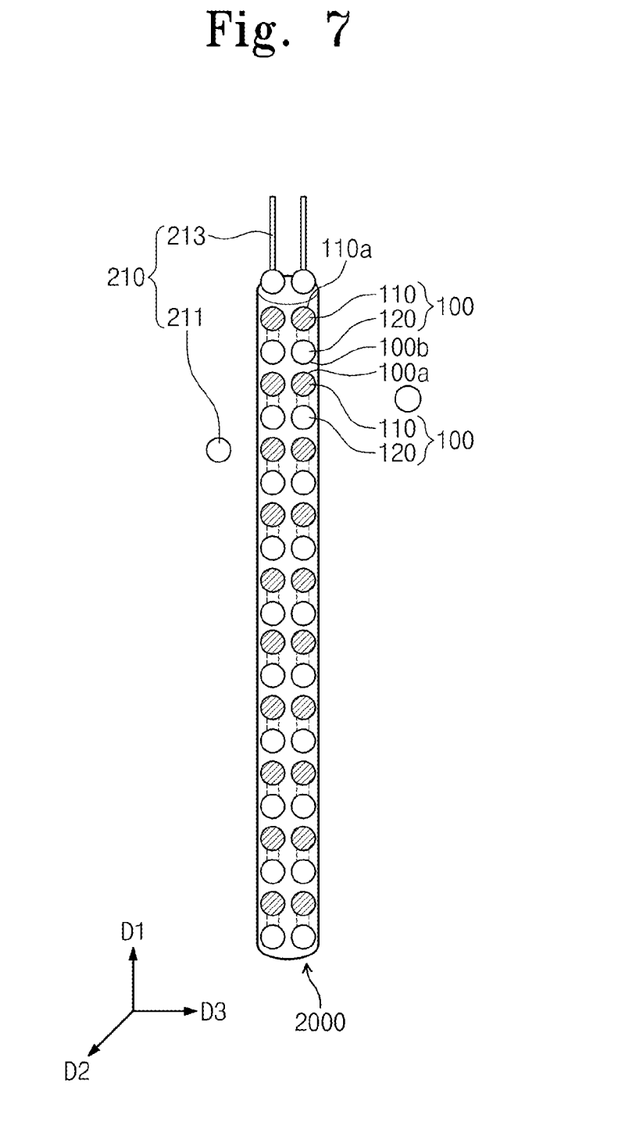
Figure 8:
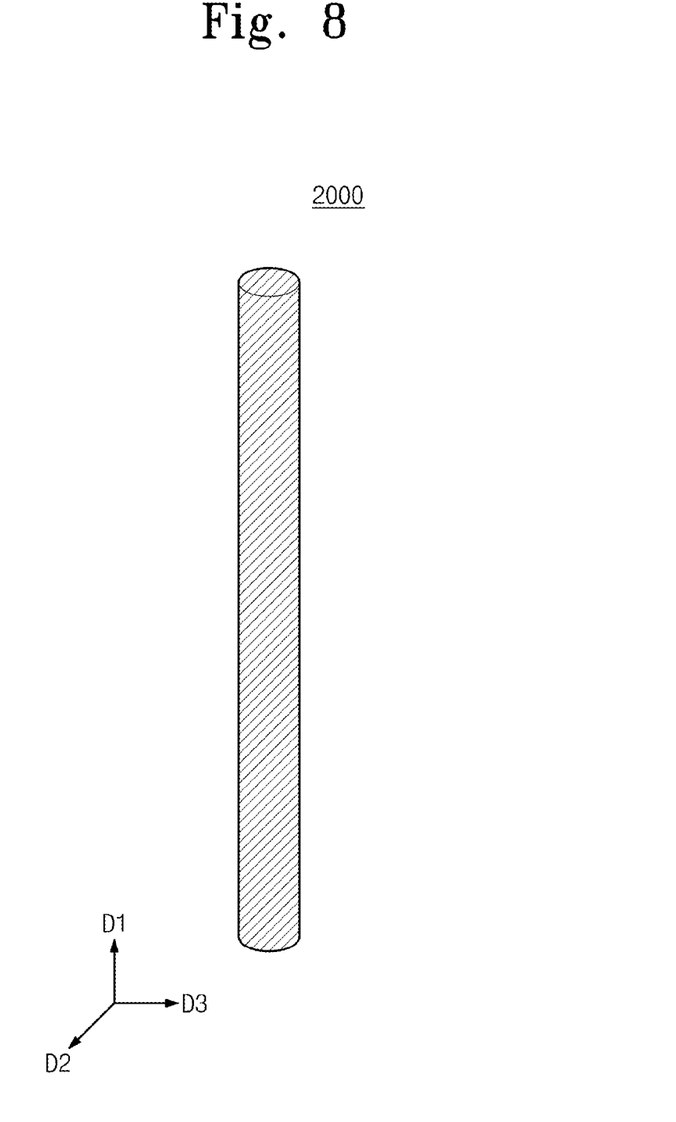

FIGS. 6 to 8 are schematic views illustrating a process of fabricating metal oxide according to an embodiment of the present invention. Hereinafter, repeated descriptions will be omitted.

Referring to FIG. 6, a cationic surfactant 210 may be added into a preparation solution to fabricate a precursor solution. The preparation solution may be fabricated through a method that is equal or similar to that described in FIG. 1. The cationic surfactant 210 in the precursor solution may be dissociated into a quaternary ammonium ion 211 and an anion 213. The cationic surfactant 210 may be ammonium salt, for example tetraethylammonium tetrafluoroborate (TEFB).

Metal oxide nanoparticles 100 may be formed in the precursor solution. The precursor solution may be heat treated in a condition that is equal or similar to that described as an example of FIG. 3 and form each of the metal oxide nanoparticles 100. The anion 213 of the surfactant may interact with a metal cation 110 of the metal oxide nanoparticle 100. One end 100a of the metal oxide nanoparticle 100 may be covered by the anion 213 of the surfactant. The quaternary ammonium ion 211 may be difficult to interact with the metal oxide nanoparticle 100 because of four hydrocarbon groups thereof. Thus, an oxygen anion 120 of the metal oxide nanoparticle 100 may not be combined with the cationic surfactant 210. The other end 100b of the metal oxide nanoparticle 100 may not be covered by the cationic surfactant 210.

Referring to FIG. 7, a metal oxide nanowire 2000 may be formed through the combination of the metal oxide nanoparticles 100. The metal oxide nanoparticles 100 may be combined with each other through the heat treatment of the precursor solution. The metal oxide nanoparticles 100 may be combined with each other through the same process (for example, the heat treatment) as the forming process of the metal oxide nanoparticles 100 described above in FIG. 3. One oxygen anion 120 of the metal oxide nanoparticle 100 may be combined with a metal cation 110 of the other metal oxide nanoparticle 100. The other end 110b of one of the metal oxide nanoparticles 100 may be spaced apart from the cationic surfactant 210 combined with the one end 100a of the metal oxide nanoparticle 100. The other metal oxide nanoparticle 100 may be the metal oxide nanoparticle 100 which is not combined with the cationic surfactant 210. And thus, the other end 100b of the one of the metal oxide nanoparticles 100 may be connected to the one end 100a of the other metal oxide nanoparticle 100. A combination rate of the metal oxide nanoparticles 100 in second and third directions D2 and D3 may be faster than that of the metal oxide nanoparticles 100 in a first direction D1. The first direction D1 may be defined as a direction connecting the one end 100a to the other end 100b of the metal oxide nanoparticle 100. Thus, the metal oxide nanowire 2000 may be fabricated.

Referring to FIG. 8, the metal oxide nanowire 2000 may be sintered to remove the cationic surfactant 210 in FIG. 6 and impurities. And thus, the metal oxide nanowire 2000 may be fabricated. The metal oxide nanowire 2000 may have a long axis extending toward the first direction D1.

Figure 9:
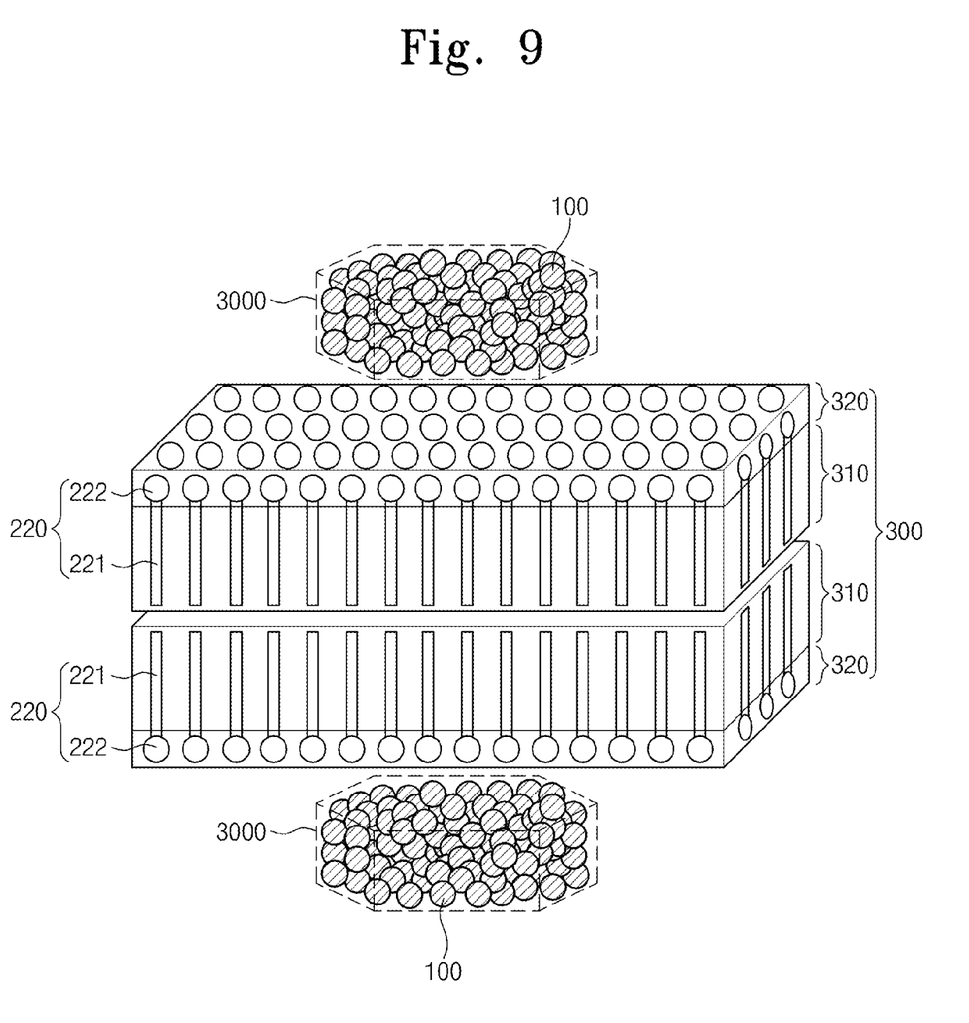
FIGS. 9 and 10 are schematic views illustrating a process of fabricating metal oxide according to an embodiment of the present invention.
Figure 10:
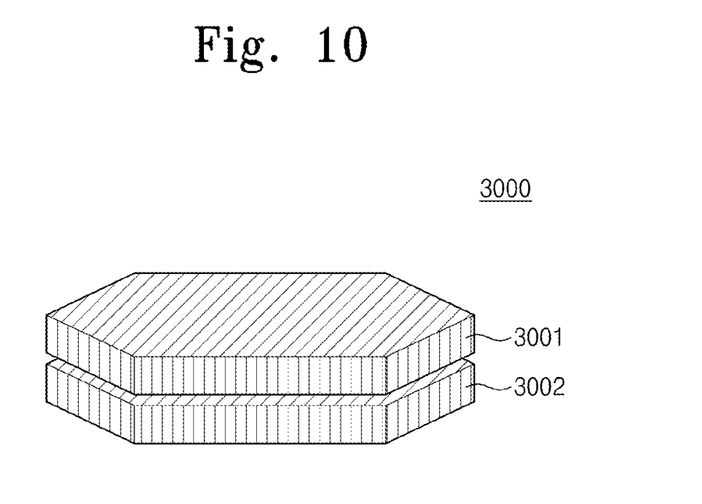

FIGS. 9 and 10 are schematic views illustrating a process of fabricating metal oxide according to an embodiment of the present invention.

Referring to FIG. 9, non-ionic surfactants 220 may be added into a preparation solution to fabricate a precursor solution. The preparation solution may be fabricated a method that is equal or similar to that described in FIG. 1. The non-ionic surfactants 220 may be an amphiphilic molecule. For example, polyethylene glycol tert-octylphenyl ether may be used as the amphiphilic molecule. The non-ionic surfactants 220 may form a lamella structure 300 in the metal precursor solution. For example, the lamella structure 300 may include inner layers 310 disposed between outer layers 320. Hydrophilic functional groups 222 of the non-ionic surfactants 220 may form the outer layers 320. Hydrophobic functional groups 221 of the non-ionic surfactants 220 may face each other and form the inner layers 310.

The metal oxide nanoparticles 100 may be formed in the precursor solution. The metal oxide nanoparticles 100 may be formed through the heat treatment performed in a condition that is equal or similar to that described as an example of FIG. 3. The metal cation 110 of the metal oxide nanoparticle 100 may interact with the hydrophilic functional group 222 of the non-ionic surfactant 220. Accordingly, the metal oxide nanoparticles 100 may be provided on the outer layers 320, respectively. The metal oxide nanoparticles 100 are combined with each other to form a metal oxide disc 3000 on each of the outer layer 320. The metal oxide disc 3000 may have a hexagonal structure.

Referring to FIG. 10, the metal oxide discs 3000 may be formed in a pair. For example, each of the metal oxide discs 3000 may include a first disc 3001 and a second disc 3002 that are spaced apart from each other. Each of the first and second discs 3001 and 3002 may have a hexagonal structure. The second disc 3002 may have a shape and a size that are equal or similar to those of the first disc 3001. In an aspect of plan, the second disc 3002 may overlap with the first disc 3001. The metal oxide nanoparticles 100 (in FIG. 9) may be heat treated at about 350° C. to about 500° C. for an hour to form the metal oxide disc 3000. Here, the non-ionic surfactants 220 (in FIG. 9) may be removed.

Hereinafter, a solar cell including the metal oxide fabricated according to the present invention will be described below. Here, repeated descriptions will be omitted.

Figure 11:
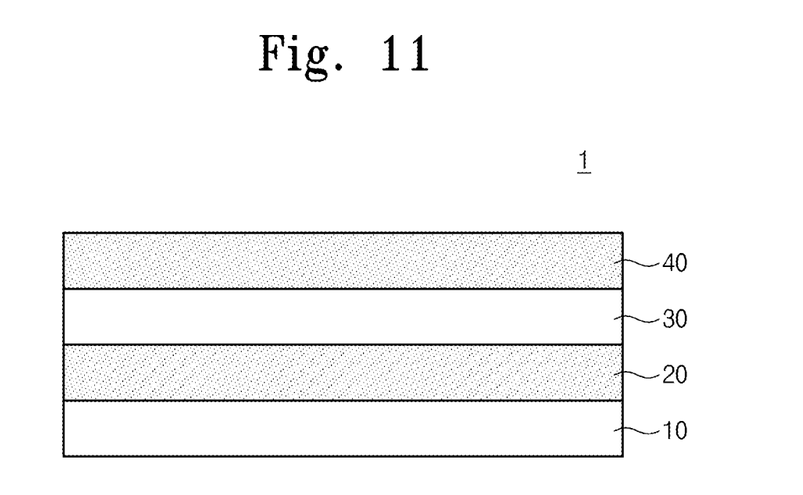
FIG. 11 is a cross-sectional view of a solar cell according to an embodiment of the present invention.

FIG. 11 is a cross-sectional view of a solar cell according to an embodiment of the present invention.

Referring to FIG. 11, a solar cell 1 may include a substrate 10, a first electrode 20, an electrolyte layer 30, and a second electrode 40.

The first substrate 10 may be at least one selected from various transparent substrates including a glass substrate. Alternatively, the first substrate 10 may be an opaque substrate. The first electrode may include a conductive material, for example, a transparent conductive oxide. The electrolyte layer 30 may be disposed on the first electrode 20. The electrolyte layer 30 may be a phase selected from a liquid phase, a solid phase, and a gel phase. According to the phase of the electrolyte layer 30, an order of forming the electrolyte 30 may be changed. The second electrode 40 may be provided on the electrolyte layer 30. The second electrode 40 may include a conductive material, for example, a transparent conductive oxide. One of the first and second electrodes 20 and 40 may be an anode, and the other one of the first and second electrodes 20 and 40 may be a cathode.

At least one of the first and second electrodes 20 and 40 may include one of the metal oxide sheet 1000 fabricated according to FIGS. 1 to 5, the metal oxide nanowire 2000 fabricated as an example according to FIGS. 6 to 8, and the metal oxide disc 3000 fabricated as an example of FIGS. 8 to 10. A kind of the used surfactant may be controlled to adjust a shape of the metal oxide to be fabricated. The metal oxide may have an energy bandgap of about 3.37 eV and excitation combination energy of about 60 meV. Thus, the solar cell 1 may have high photoconductivity. Since the first and second electrodes 20 and 40 have excellent stability with respect to ultraviolet rays, the solar cell 1 may not be damaged by solar light including the ultraviolet rays.

The metal oxide of the present invention may have various shapes such as the sheet, the nanowire, the disc, or the like. The metal oxide may be fabricated by using the surfactant. According to the kind of the used surfactant, the metal oxide nanoparticles may be determined in growth direction. The metal oxide may be used as the electrode for the solar cell. The solar cell including the metal oxide of the present invention may have excellent photoconductivity and stability.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. Therefore, the preferred embodiments should be considered in descriptive sense only and not for purposes of limitation.

What is claimed is:

1. A method of fabricating a metal oxide sheet having a polycrystalline structure, the method comprising:
    mixing a metal precursor material, a base material, and distilled water with each other to fabricate a preparation solution;
    adding an anionic surfactant into the preparation solution to forming a precursor solution;
    forming metal oxide nanoparticles in the precursor solution, wherein each of the metal oxide nanoparticles comprises a metal cation and an oxygen anion; and
    fabricating a metal oxide sheet by coupling the metal oxide nanoparticles to each other,
    wherein, in an aspect of a plane, the metal oxide sheet has a hexagonal shape and a polycrystalline structure.

2. The method of claim 1, wherein each of the metal oxide nanoparticles has a first end and a second end, which face each other, and the anionic surfactant covers the first end and the second end of the metal oxide nanoparticle, and a side portion of the metal oxide nanoparticle is spaced apart from the anionic surfactant.

3. The method of claim 2, wherein a coupling reaction rate at the side portion of the metal oxide nanoparticle is faster than that at each of the first end and the second end of the metal oxide nanoparticle.

4. The method of claim 1, wherein the fabricating of the metal oxide sheet comprises horizontally coupling the metal oxide nanoparticles to each other, wherein the anionic surfactant is provided to upper and lower ends of the metal oxide nanoparticle.

5. The method of claim 1, wherein the anionic surfactant is dissociated into a cation and an active agent in the precursor solution, and the active agent comprises a hydrophobic functional group and a hydrophilic functional group coupled to the hydrophobic functional group, and the metal oxide nanoparticle is disposed between the hydrophilic functional group and the cation of the anionic surfactant.

6. The method of claim 5, wherein the hydrophilic functional group of the anionic surfactant is provided on the metal cation of the metal oxide nanoparticle, and a cation of the anionic surfactant is provided on the oxygen anion of the metal oxide nanoparticle.

7. The method of claim 1, wherein the forming of the metal oxide nanoparticles and the fabricating of the metal oxide sheet are performed by thermally treating the precursor solution.

* * * * *